United States Patent [19]

Kunz et al.

[11] Patent Number: 4,570,616

[45] Date of Patent: Feb. 18, 1986

[54] VIBRATOR MASSAGER USING BEAT FREQUENCY

[75] Inventors: Raymond W. Kunz, Monroe, Conn.; Gerald K. Pitcher, Boston, Mass.

[73] Assignee: Clairol Incorporated, New York, N.Y.

[21] Appl. No.: 702,528

[22] Filed: Feb. 19, 1985

[51] Int. Cl.$^4$ ........................ F16H 33/18; A61H 1/00

[52] U.S. Cl. ........................................... 128/36; 74/61

[58] Field of Search .................. 128/24.1, 24.3, 35-38, 128/47, 54-56; 74/61, 87

[56] References Cited

U.S. PATENT DOCUMENTS

| | | | |
|---|---|---|---|
| 2,309,172 | 1/1943 | DeKanski | 74/61 |
| 2,399,503 | 4/1946 | Ott | 74/61 |
| 3,233,474 | 2/1966 | Ross | 74/87 |
| 3,433,311 | 3/1969 | Lebelle | 74/61 |
| 4,113,034 | 9/1978 | Carlson | 74/61 |
| 4,262,549 | 4/1981 | Schwellenbach | 74/61 |

FOREIGN PATENT DOCUMENTS

| | | | |
|---|---|---|---|
| 219522 | 2/1962 | Austria | 74/61 |
| 1483410 | 9/1969 | Fed. Rep. of Germany | 74/87 |
| 492314 | 1/1976 | U.S.S.R. | 74/61 |

*Primary Examiner*—Clyde I. Coughenour
*Attorney, Agent, or Firm*—Gene Warzecha

[57] ABSTRACT

An improved therapeutic vibration device using dual motors and rotating discs having eccentric weights. The rotating discs have slightly different effective diameters and are mutually frictionally connected by either providing the rims thereof with a different number of gear teeth or with an elastomeric or other friction material. A vibrational device having such separated motors can be enclosed in a cushion or pillow for convenient use by an individual.

4 Claims, 4 Drawing Figures

VIBRATOR MASSAGER USING BEAT FREQUENCY

BACKGROUND OF THE INVENTION

1. Field of the Invention

The present invention pertains to vibration devices used for therapeutic purposes, and pertains particularly to such devices utilizing dual vibrator motors operating at different frequencies.

2. Description of the Prior Art

Vibratory devices are known using rotary members with eccentric weights. For example, such devices are disclosed by U.S. Pat. Nos. 3,124,125; 3,812,848; 4,059,110; and German Pat. No. 1,276,870. Also, U.S. Pat. No. 4,224,931 to Nelkin discloses a vibrating apparatus which utilizes a motor mechanically attached to dual vibrating arms to provide an enhanced vibratory effect.

Additionally, it is known from U.S. Pat. Nos. 3,653,375 and 4,105,024 to provide furniture with two vibrating motors vibrating or rotating at different frequencies to impart interference waves into the rigid furniture frame. However, none of the known prior art devices is suitable for imparting interference or beat frequency vibrations into small body massage appliances not having a rigid frame structure. Furthermore, prior art interference wave producing devices such as that shown in the aforementioned U.S. Pat. No. 3,653,375 require relatively complex control systems to regulate the amplitude and frequency of the beat frequency oscillations. The deficiency is exacerbated in body massage appliances since it has been found that a low massaging cycle rate on the order of one cycle per second is pleasing and advantageous to the user and such low rates are not known in small, light weight body massage appliances. Consequently, further improvements in such vibration devices are desirable and are provided by the device of the present invention.

It is an object of this invention to provide a vibrator appliance capable of producing beat frequencies or interference vibrations in any desired structure.

It is another object of this invention to provide a beat frequency body massage appliance for imparting massaging vibrations to selected body parts.

SUMMARY OF THE INVENTION

In the preferred embodiment the present invention provides a vibration device which utilizes dual electric motors, each rotatably driving a disc having an attached eccentric weight at slightly different speeds so as to provide a beat frequency and accentuated impulses. The discs have slightly different diameters or numbers of gear teeth and the housings of the two motors are physically connected together by being attached to a common support structure. The two motors are located adjacent to each other with the two rotating disc members in frictional (or geared) contact along their rims in order to increase the impulse effect produced by the beat frequency generated by the dual rotating discs. In this embodiment only one drive motor is necessary since the differential gearing on the discs combined with the eccentric weights will create a beat frequency. The common support structure may be applied to a pad or the like for imparting the vibrations to a body surface.

Alternatively, the dual motors and discs can be physically separated and connected together by an extended flexible linear frame structure. This provides an arrangement which can be incorporated into a pillow or similar structure for imparting massaging vibrations to the back, neck or other selected body part.

BRIEF DESCRIPTION OF THE DRAWINGS

The invention will be better understood by reference to the following drawings showing different embodiments of the invention.

DESCRIPTION OF THE PREFERRED EMBODIMENTS

Figure 1:
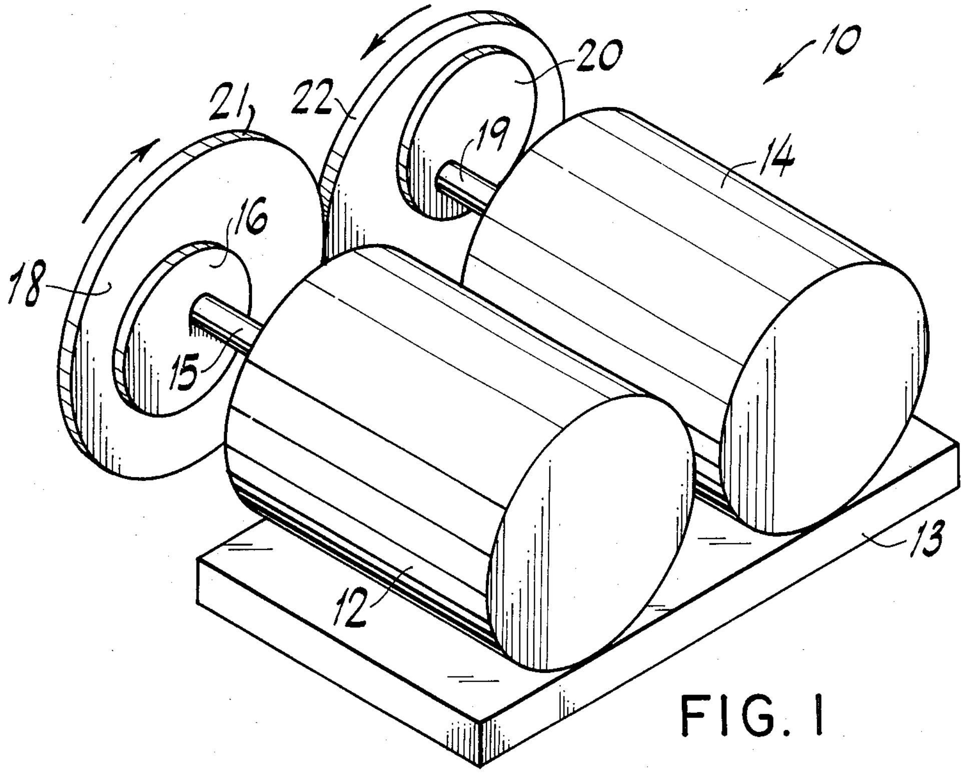
FIG. 1 shows a perspective view of dual motors mounted adjacent and parallel to each other on a common support structure and each driving eccentric weighed discs the rims of which are in mutual frictional contact with each other.

One useful embodiment of the invention is shown by FIG. 1. Vibration device 10 includes dual motors 12 and 14, each supported on a common base support 13. Motor 12 is connected by shaft 15 to eccentric weight 16 and to cylindrical disc 18. Similarly, motor 14 is connected by shaft 19 to eccentric weight 20 and cylindrical disc 22. The weights may be attached to the respective discs directly. Cylindrical discs 18 and 22 have outside diameters which differ by some predetermined amount depending upon the desired beat frequency range and which are mutually frictionally connected together along frictional surfaces 21 and 22, which can advantageously be provided by an elastomeric material such as polyethylene or neoprene and the like. Engagement between the discs may alternatively be provided by gear teeth (not shown) where the number of teeth in each disc differs from the number of teeth in the other disc by some predetermined amount. To provide for quite operation, the discs 18 and 22 should be made of a sound absorbent material such as nylon, particularly for the gear teeth.

In a useful example, the rotational speeds of motors 12 and 14 could be 3000 rpm and 3060 rpm, respectively, and the number of gear teeth on corresponding discs 18 and 22 could be 50 and 51 respectively (note that the disc diameters may be the same). Thus, the motor speeds would be 50 revolutions/sec. and 51 revolutions/sec., respectively, thereby generating a beat or impulse force frequency of 1 cycle/sec. Impulse frequencies of between 0.5 and 2 cycles/sec. have been found to be useful and desirable in vibration devices, such as used for massage of the back or feet.

It should be obvious that the two different motor speeds are necessitated by the fact that the discs have different diameters or numbers of gear teeth. (Essentially, the discs have different "effective" diameters even if the actual diameters are equal.) The use of two motors is desirable to share the load thereby enabling use of smaller motors and fine pitch gears so that the gears are used only for synchronization and not for power transmission. Alternatively, one motor could be used to drive one disc while the other disc could be driven by being mounted on an idling shaft (both motor and shaft being attached to a common support). Each embodiment produces a small, compact, beat frequency produing vibrator. Each embodiment may be enclosed in a suitable housing (not shown) and the common support of each may be attached to a cushioned pad or the like (not shown) in order to comfortably impart the massaging vibrations to the body.

Figure 2:
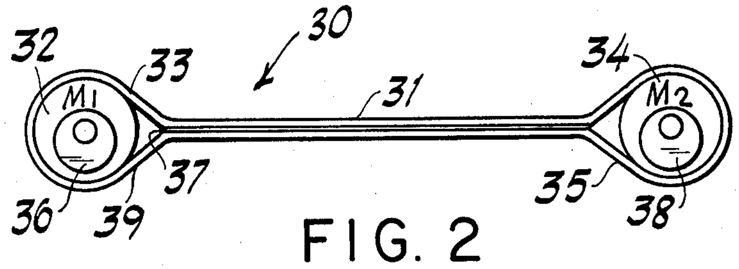
FIG. 2 shows an elevation view of dual motors in an alternate embodiment.

In another useful embodiment of the invention as illustrated by FIG. 2, vibration device 30 utilizes dual motors 32 and 34 which are enclosed within housings 33 and 35, respectively, the housings connected together by a thin, planar connecting structure 31. Each motor 32 and 34 is equipped with a rotating shaft and eccentric weight 36 and 38, respectively. The housings 33 and 35 are separated via structure 31 by a convenient distance, such as 6–18 inches depending on the particular device and its intended application. This embodiment is useful, for example, as a back massager where structure 31 could be encased within a padded shell (not shown) and the housings 33 and 35 cound fit on either side of a user's back near the arms. The connecting structure 31 may include a flexible metal or plastic reinforcing bar 37 riveted or glued between an encasing plastic sheet 39 which holds all components (except an enclosing padded shell) together. Note that plastic sheet 39 must be wide enough to protect the rotating weights 36 and 38 if they are exposed.

Figure 3:
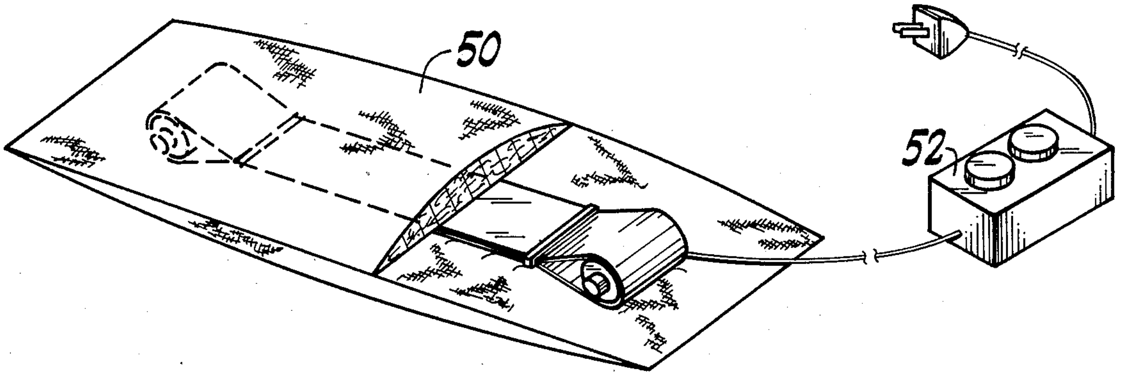
FIG. 3 shows a perspective view of the motor arrangement of FIG. 2 incorporated for use in a pillow.

Because the rotational speeds of motors 32 and 34 must be sufficiently different to generate a beat frequency of preferably 0.5–2 cycles/sec., a motor speed control means is provided as shown in FIG. 3. The D.C. supply voltage provided at 40 may be fixed, pulsed or variable to provide control of the basic speeds of the motors. A balance potentiometer 42 is provided for adjusting the specific voltage to each motor as needed for precise contrl of its speed, so as to generate the desired beat frequencies. It is noted that no such control circuit is required for the embodiment shown in FIG. 1 since the beat frequency in that embodiment is generated by the interaction of differentially geared eccentric weighted discs and the motor speeds are restricted accordingly.

Figure 4:
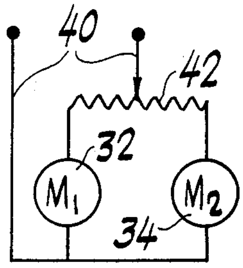
FIG. 4 shows a simplified control circuit diagram for use with the embodiment of FIG. 2.

One useful application for vibration device 30 per the FIG. 2 embodiment of the invention is illustrated in FIG. 4, in which the device 30 is enclosed within resilient enclosure 50 such as a pillow. The control equipment is provided at 52, and includes the transformer, rectifier, balance potentiometer and optional speed control means for the dual motors 32 and 34.

While the present invention has been described by means of the foregoing embodiments, reference should be had to the appended claims for a definition of the scope of the invention. It should also be obvious to those skilled in the art that numerous other modifications and improvements may be made to the preferred embodiments of the invention disclosed herein without departing from the spirit and scope thereof.

We claim:

1. A vibration producing device for providing an impulse at a beat frequency comprising:

(a) a common support structure;

(b) two electrically driven motors, the housing of each motor connected to said common support structure;

(c) a cylindrical disc axially attached to the shaft of each motor for rotation therewith, the rims of said discs in operative engagement with each other, said discs having effective diameters differing from each other by a predetermined amount;

(d) an eccentric weight attached to the shaft of each motor.

2. A vibration device according to claim 1, wherein each eccentric weight is attached to a respective one of said discs.

3. A vibration device according to claim 1, wherein said discs are aligned in the same plane and the operative engagement between said discs is provided by an elastomeric material attached to the perimeter of each disc.

4. A vibration device according to claim 1, wherein the operative engagement between said discs is provided by gear teeth.

* * * * *